US006955331B2

(12) United States Patent
Larsen et al.

(10) Patent No.: US 6,955,331 B2
(45) Date of Patent: Oct. 18, 2005

(54) AXIAL VALVE

(75) Inventors: Soeren Michael Larsen, Odense NV (DK); Erik Casper Joergensen, Skanderborg (DK); Michael Birkelund, Middelfart (DK)

(73) Assignee: Danfoss A/S, Nordborg (DK)

( * ) Notice: Subject to any disclaimer, the term of this patent is extended or adjusted under 35 U.S.C. 154(b) by 62 days.

(21) Appl. No.: 10/693,349

(22) Filed: Oct. 24, 2003

(65) Prior Publication Data
US 2004/0084646 A1 May 6, 2004

(30) Foreign Application Priority Data
Oct. 31, 2002 (DE) .................. 102 51 167

(51) Int. Cl.[7] .......................................... F16K 31/122
(52) U.S. Cl. ................... 251/30.02; 251/30.01
(58) Field of Search .................... 251/30.01, 30.02, 251/30.03, 30.04, 30.05, 357

(56) References Cited

U.S. PATENT DOCUMENTS

| | | | |
|---|---|---|---|
| 2,799,466 A | | 7/1957 | Hickerson |
| 2,919,714 A | * | 1/1960 | Mrazek ............... 251/30.02 |
| 2,921,466 A | | 1/1960 | Nerwin, Jr. |
| 3,533,434 A | * | 10/1970 | Smith ..................... 251/26 |
| 3,540,462 A | * | 11/1970 | Renzi .................. 251/30.04 |
| 3,981,479 A | | 9/1976 | Foster et al. |
| 4,073,464 A | * | 2/1978 | Hansen et al. ......... 251/30.02 |
| 4,082,148 A | * | 4/1978 | Willms ................... 251/26 |
| 4,194,694 A | | 3/1980 | Hickerson |
| 4,197,873 A | | 4/1980 | Minogue et al. |
| 4,201,362 A | * | 5/1980 | Nishimi et al. ......... 251/30.05 |
| 4,651,768 A | | 3/1987 | Epe |
| 4,671,485 A | | 6/1987 | Saarem |
| 4,925,153 A | * | 5/1990 | Romer ................. 251/30.01 |
| 4,967,996 A | | 11/1990 | Sonoda et al. |
| 6,029,720 A | | 2/2000 | Swinford |
| 6,039,073 A | | 3/2000 | Messick et al. |

FOREIGN PATENT DOCUMENTS

| | | |
|---|---|---|
| DD | 253 461 A1 | 1/1988 |
| DE | 33 15 972 A1 | 11/1984 |
| DE | 199 01 253 A1 | 7/2000 |
| EP | 0 066 795 B2 | 12/1982 |
| EP | 0 230 849 A1 | 8/1987 |
| EP | 0 727 600 A1 | 8/1996 |
| EP | 1 207 326 B1 | 5/2002 |
| FR | 2 390 655 | 1/1979 |
| GB | 2 217 816 A | 11/1989 |
| WO | WO 85/04231 | 3/1985 |
| WO | WO 94/27069 | 5/1994 |
| WO | WO 95/23309 | 8/1995 |

* cited by examiner

Primary Examiner—John Bastianelli
(74) Attorney, Agent, or Firm—McCormick, Paulding & Huber LLP

(57) ABSTRACT

An axial valve has a housing, an inlet, an outlet, a valve seat between the inlet and the outlet, and a valve element cooperating with the valve seat, and is controlled by a pilot valve arranged between the inlet and the outlet, with the valve element being moveable parallel to a flow path from the inlet to the outlet and surrounding an interior space. Without changing the external measurements of the valve an increased through flow is achieved in that a first section of the flow path leads through the interior space and a pressure space is arranged between the housing and the valve element, in which pressure space in the closed condition of the pilot valve a closing pressure is formed and applied to the valve element.

14 Claims, 4 Drawing Sheets

AXIAL VALVE

CROSS-REFERENCE TO RELATED APPLICATIONS

This application is entitled to the benefit of and incorporates by reference essential subject matter disclosed in German Patent Application No. 102 51 167.5 filed on Oct. 31, 2002.

FIELD OF THE INVENTION

The invention concerns an axial valve with a housing, an inlet, an outlet, a valve seat between the inlet and the outlet and a valve element cooperating with the valve seat, which is controlled by a pilot valve arranged between the inlet and the outlet, the valve element being moveable parallel to a flow path from the inlet to the outlet and surrounding an interior space.

BACKGROUND OF THE INVENTION

In one such axial valve, which is distributed by Danfoss A/S, Nordborg, Denmark, the valve element is guided in a cage arranged between the inlet and the outlet. The valve element is hollow. A spring is received in the hollow space which presses the valve element in the axial direction out of the cage and into engagement with the valve seat. When the valve element is lifted from the valve seat, the control fluid flows outwardly around the cage and outwardly around the valve element in order to flow outwardly through the valve seat to the outlet.

Such a valve has proven itself to be basically successful. However, an increase in the through flow is limited if one wishes to retain the exterior measurements.

SUMMARY OF THE INVENTION

The invention has as its object an increasing of the through flow without change in the external measurements.

This object is solved in an axial valve of the previously mentioned kind in that a first section of the flow path leads through the interior space and a pressure space is arranged between the housing and the valve element in which pressure space, in the case of a closed pilot valve, a pressure is formed which works on the valve element in the closing direction.

One therefore changes the flow path for the fluid. The fluid no longer flows outwardly around the valve element, but instead passes through the valve element. When the pilot valve is opened pressure relationships are created which lead to the opening of the valve, that is to the lifting of the valve element from the valve seat. The pilot valve thereby controls the same fluid which is to be controlled by the valve. This simplifies the operation of the valve. The valve element is guided in a housing bore, that means one can considerably increase the external diameter of the valve element so that a corresponding enlargement of the interior space is possible. The enlargement of the interior space makes available in turn a relatively large flow cross-section so that the valve, when it is opened, creates only a decidedly small pressure drop. Therefore, since the pressure space is arranged between the housing and the valve element, it is possible to make the valve element rotationally symmetrical. This simplifies its manufacture. The angular orientation of the valve element relative to the housing need no longer be considered.

It is also preferred that the valve element be guided on the inner wall of the interior space by a guide which surrounds a second section of the flow path. Thereby the hollow space, which now serves to form the flow path, has a second object. It serves namely at the same time to guide the valve element on the guide. Therefore, it is no longer necessary to place the guide in the form of a cage in the flow path of the fluid. One can much more freely design the guide.

In keeping with this, it is preferred that the guide is arranged in fixed relation to the housing. This provides an increased stability for the guiding of the valve element. The guide can, for example, be formed as an insert which is inserted into the housing of the valve and is there fixed in place.

Preferably, the flow path passes through the valve seat. The valve seat therefore surrounds, as is customarily known, an opening which serves for the outflow of the fluid which is controlled by the valve. The valve seat forms therefore, no additional flow resistance as, for example, would a plate arranged in the middle of the flow path and around which flow has to flow.

Preferably, the valve element has at its end facing the valve seat a closed surface. This surface then closes the opening which is surrounded by the valve seat. This simplifies the control and design of the valve element.

Preferably, the valve element is guided in the housing bore without seals. The forces which one needs to move the valve element are kept small. One avoids, namely, a seal between the valve element and the housing. An axial valve of the kind in question for opening requires a differential pressure between the inlet and the outlet. By the elimination of a seal between the valve element and the housing wall now very small differential pressures are sufficient because the valve element is practically friction free or at least can be supported in the housing with only very small friction. Therefore, the valve element can be moved if the differential pressure between the inlet and the outlet is only very small. This is of special advantage in the case of axial valves which are controlled with the help of a pilot valve, because the pilot valve controls the same fluid material or the same fluid that is to be controlled by the cooperation between the valve element and the valve seat. By the elimination of a seal between the valve element and the housing there results indeed small leakages, which, however, can be caught in that one provides a seal at another spot, for example, at the forward end of the valve element. The end effect is therefore that an axial valve is obtained which has the same sealing ability, but which makes available improved characteristics because of one conducting the flow of the fluid through the valve element.

Preferably, the pilot valve is arranged in a connection between a pressure space, in which prevails a pressure urging the valve in the closing direction, and the outlet. If the pilot valve opens then the pressure in the pressure space sinks to the pressure in the outlet. Then the pressure in the inlet works on the valve element in the opposite direction, which moves the valve element in the opening direction. This is a relatively simple possibility for controlling the valve element.

Preferably, the pressure space is supplied with pressure through a seepage path which stands in connection with the interior space. The seepage path can indeed be formed by a distinct surface structure between the valve element and the housing, for example, which forms the valve element and the guide. This, however, is in general not necessary. In most cases, the valve element is not so play free suited to the housing or to the guide that the system is absolutely sealed.

By means of the play between the valve element and the housing or the guide a sufficient amount of fluid material can move into the pressure space which then serves for the closing of the valve. Since this pressure space is arranged outwardly of the valve element, a relatively large surface stands available. The force by which the valve element is pressed against the valve seat increases accordingly. This results in a reliable valve function because the valve is closed with a greater force. Preferably, the seepage path becomes shortened upon the opening of the valve. This eases the movement of the valve element to the closed position. One must only dose the pilot valve. Because of the shortened extent of the leakage path, which exists in the opened condition of the valve element, the fluid has a lower resistance to encounter in its passage to the pressure space. The pressure space accordingly fills itself faster and moves the valve element to the closed position.

Preferably, a spring working in the closing direction is arranged in the pressure space. This spring supports the closing moment. The opening moment is then brought about by the pressure in the inlet, which accordingly must work on a larger surface. Here again is shown the advantage of the inventive construction of the valve element. Since the valve element is guided on its hollow inner space the pressure at the inlet can work on a relatively large surface and can create a correspondingly large force. Therefore, it is possible to use an essentially stronger spring than previously so as to firmly close the valve. The use of a stronger spring is, as said, possible because the pressure force at the valve element works on a surface of greater diameter. A stronger spring yields a more reliable valve function.

In a preferred construction the guide is arranged at the inlet side of the valve element. The fluid is therefore guided through the guide into the guide element. Accordingly, disturbances arising from the transition from the guide to the valve element are held small.

In an alternative construction, the guide is arranged at the outlet side of the valve element. In this case, a valve element has advantageously a protruding closure piece which cooperates with the valve seat. The guide thereby surrounds the valve seat.

Preferably, in the area of the guide the valve element has an enlarged diameter. This diameter enlargement improves the positioning of the valve element for guiding purposes. Above all, it assures that relatively large pressure engaging surfaces stand available in the opening and closing directions so that the valve element can be pressed with sufficiently large forces against the valve seat.

Finally, it is of advantage if the housing in the area of the pilot valve has a radially oriented recess. The pilot valve can be supported in this recess in the housing and thereby bores are spared.

BRIEF DESCRIPTION OF THE DRAWINGS

In the following the invention is described in more detail by way of exemplary embodiments in connection with the drawings. The drawings are.

DETAILED DESCRIPTION OF THE PREFERRED EMBODIMENTS

Figure 1:
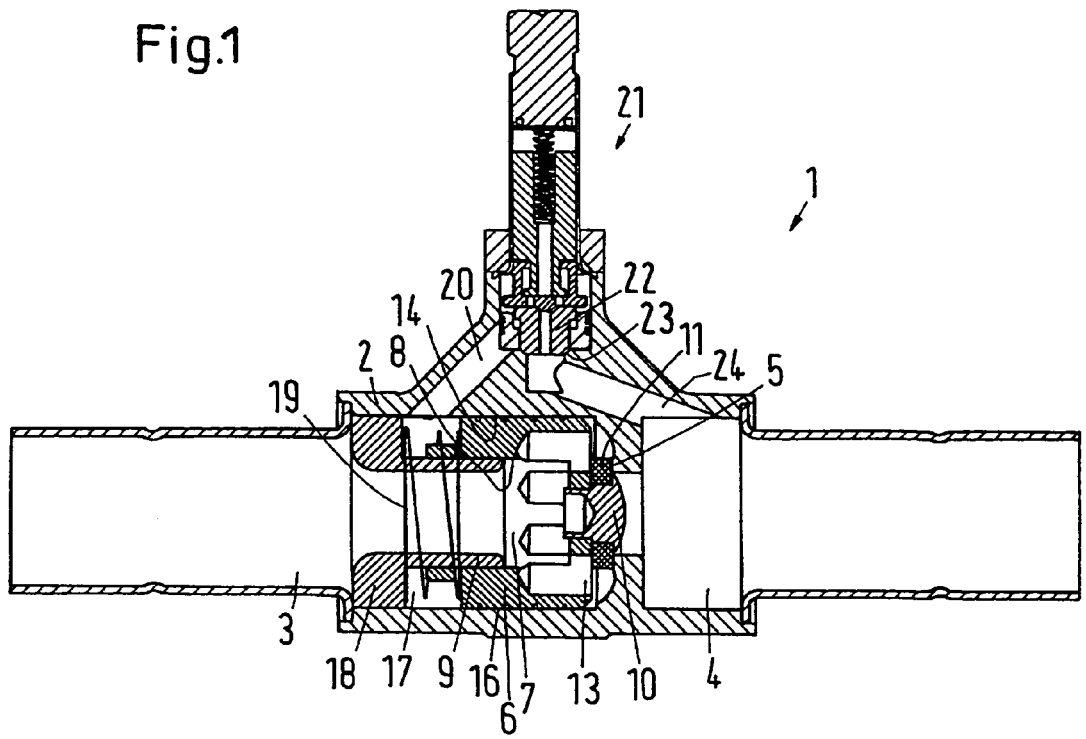
FIG. 1 a first embodiment of an axial valve in closed condition.
Figure 2:
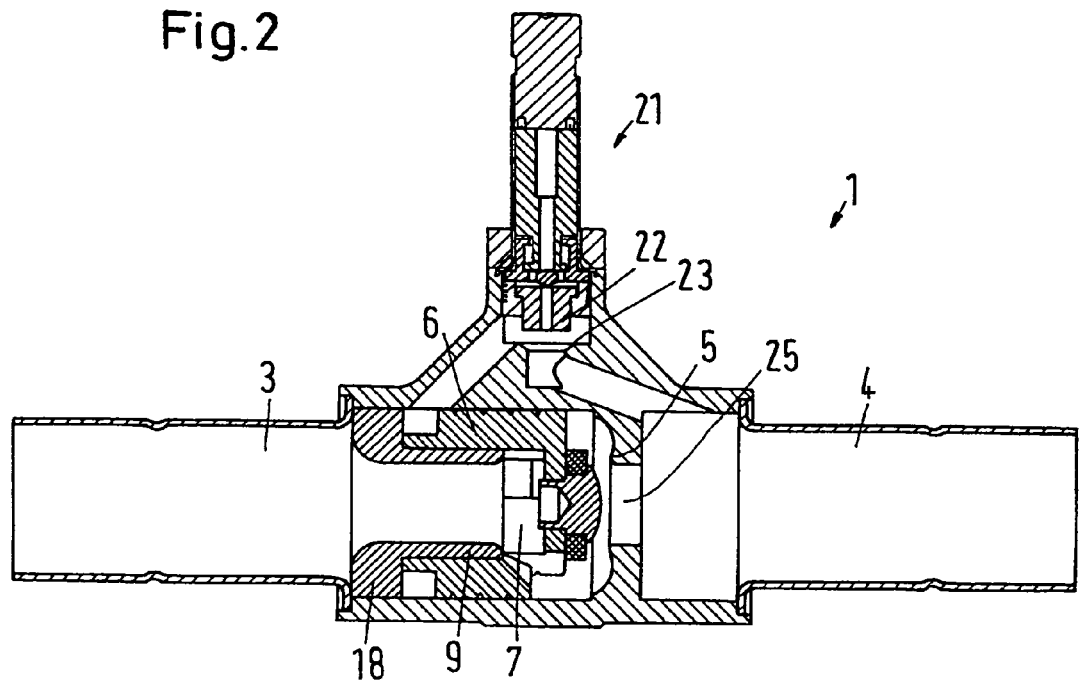
FIG. 2 the axial valve of FIG. 1 in opened condition.
Figure 3:
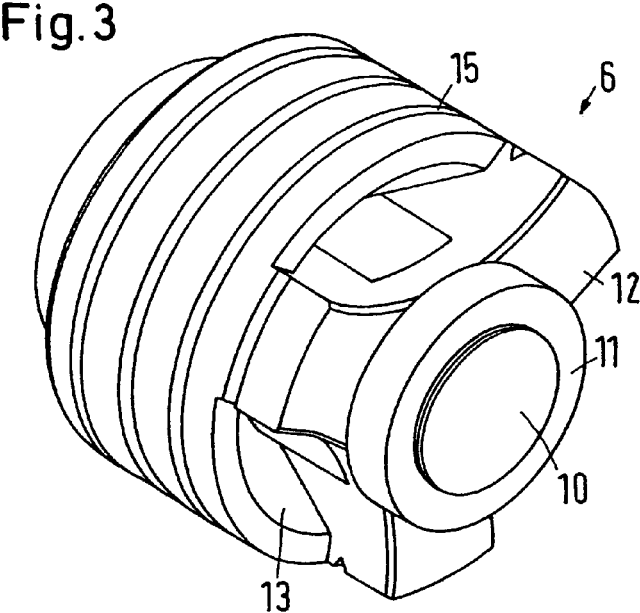
FIG. 3 a valve element of the valve of FIGS. 1 and 2 in perspective illustration, FIG. 4 the valve element in the longitudinal section IV—IV of FIG. 5, FIG. 5 an end view of the valve element, FIG. 6 a second embodiment of an axial valve in closed condition, FIG. 7 the axial valve of FIG. 6 in opened condition, and FIG. 8 a third embodiment of an axial valve in closed condition.
Figure 4:
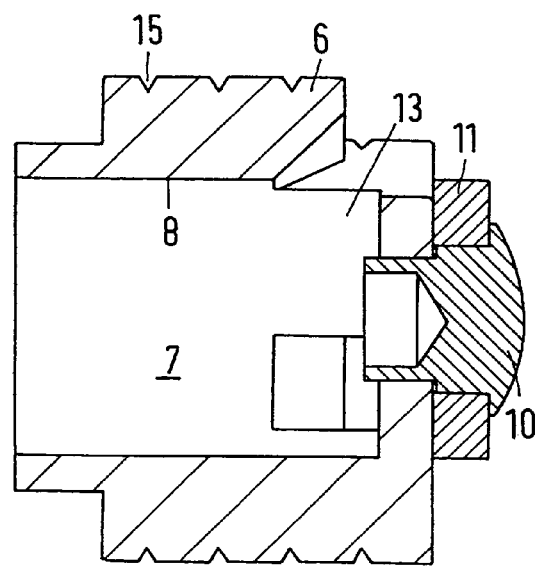
Figure 5:
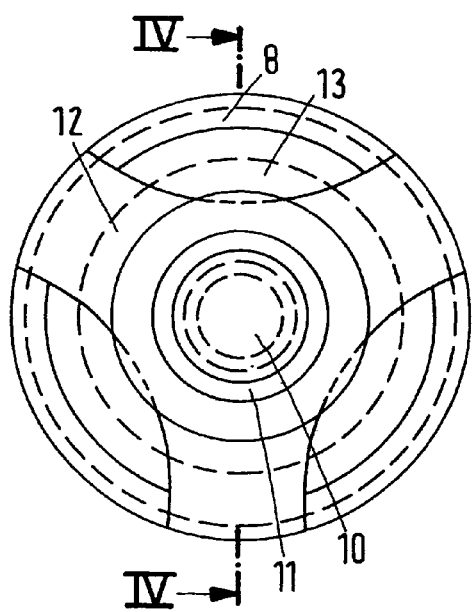

FIGS. 1 and 2 show an axial valve 1 with a housing 2 having an inlet 3 and an outlet 4. Between the inlet 3 and the outlet 4 is arranged a valve seat 5 which cooperates with a valve element 6.

The valve element 6 has a hollow interior space 7. The interior space 7 has a wall 8 by means of which the valve element 6 is guided on the outside of a guide 9, which is arranged in and fixed relative to the housing 2. The valve element 6 is therefore telescopically supported on the guide. The guide 9 is formed as an insert fixed in the housing 2.

The valve element 6 has on its side which neighbors the outlet 4 a closed surface 10 surrounded by a seal 11 which ultimately comes to lie on the valve seat 5 when the valve element 6 is in the position illustrated in FIG. 1. The surface 10 stands in connection with the wall 8 through star shaped arms 12. Between the arms 12 are formed openings 13 through which fluid can flow which reaches the interior space 7 through the inlet 3, when the valve element 6 is lifted from the valve seat 5, as is shown in FIG. 2.

The valve element 6 is further guided in a bore 14 of the housing whose internal diameter is practically exactly as large as the external diameter of the valve element 6. No seals are arranged between the valve element and the housing 2. The valve element 6 is therefore free of seals and is accordingly guided in the bore 14 with low friction. By circumferential grooves 15 in the valve element 6 it is indicated that between the valve element 6 and the bore 14 a certain amount of play is provided so that a "seepage path" 16 is formed through which fluid from the inner space 7 can reach an annular pressure space 17 bounded by the guide 9, the valve element 6 and the housing 2. The "seepage path" can also comprise a section formed between the valve element 6 and the guide 9 in the region of the wall 8. The guide 9 has a thickened end 18 whose external diameter is exactly as large as the internal diameter of the bore 14. The detailed construction of the seepage path however plays no role. One can also achieve the supplying of fluid to the pressure space 17 by providing openings or bores at other places, for example, through the end 18 of the guide 9.

Arranged in the pressure space 17 is a spring 19 which biases the spring element 16 in the closing direction and therefore presses the valve element 6 against the valve seat 5.

The pressure space 17 stands in connection with a pilot valve 21 through a channel 20. The pilot valve 21 has a pilot valve element 22 which cooperates with a pilot valve seat 23. The pilot valve seat 23 is connected with the outlet 4 through a channel 24. It acts therefore as a servo-valve, which with the help of the pilot valve 21 is activated by the same fluid which is controlled by the axial valve 1. In that the valve element 6 is guided free of seals in the bore 14 of the housing 2, the friction accompanying movement of the valve element is extremely small. Accordingly, small forces and therewith small pressure differences across the valve element 6 are sufficient to move it.

The axial valve 1 works as follows:

Fluid, which is delivered through the inlet 3 reaches the interior space 7 of the valve element 6 through the hollow guide 9, but cannot flow further because the valve element 6 lies with the seal 11 on the valve seat 5. Because of the increased pressure at the inlet 3, the fluid seeps through the seepage path 16 to the pressure space 17 until a pressure equality between the inlet 3 and the pressure space 17 is reached. The valve element 6 is biased in the closing direction by the pressure in the pressure space 17. Additionally, the valve element 6 is biased in the closing direction by the force of the spring 19. Lastly, the pressure in the inlet 3 works in the closing direction on the forward end which carries the surface 10. In the opening direction the pressure in the inlet works also and indeed on the surfaces facing the opening direction. This is essentially the thickness of the annular wall of the valve element 6 plus the surfaces of the arms 12. In regard to this, the surfaces biased in one or the other direction are so designed that the valve element 6 remains in the closed position when the pressure in the pressure space 17 is that of the pressure in the inlet 3.

If now the pilot valve 21 opens, the pressure escapes from the pressure space 17. Then the pressure in the outlet 4 practically prevails in the pressure space 17. The pressure in the inlet 3 is then in the position to lift the valve element 6 from the valve seat 5 and to shift it to the position illustrated in FIG. 2. The axial valve 1 is thereby opened.

For the fluid a flow path arises from the inlet 3 to the outlet 4, which runs through the valve seat 5, more correctly said through an opening 25 surrounded by the valve seat 5. The flow path has a first section formed in the inner space 7 of the valve element 6, and a second section formed in the hollow interior of the guide 9. As seen in the flow direction, the sequence of the two sections is naturally reversed.

For purposes of clarity, in FIG. 2 the spring 19 and the spring of the pilot valve 21 are omitted. The pilot valve element 22 is lifted from the pilot valve seat 23.

The valve element 6 in this embodiment is doubly guided, namely on one hand by the guide 9 in the interior space 7 and on the other hand in the bore 14 in the housing 2. Accordingly, in a simple way it is possible to create the annular pressure space 17.

Figure 6:
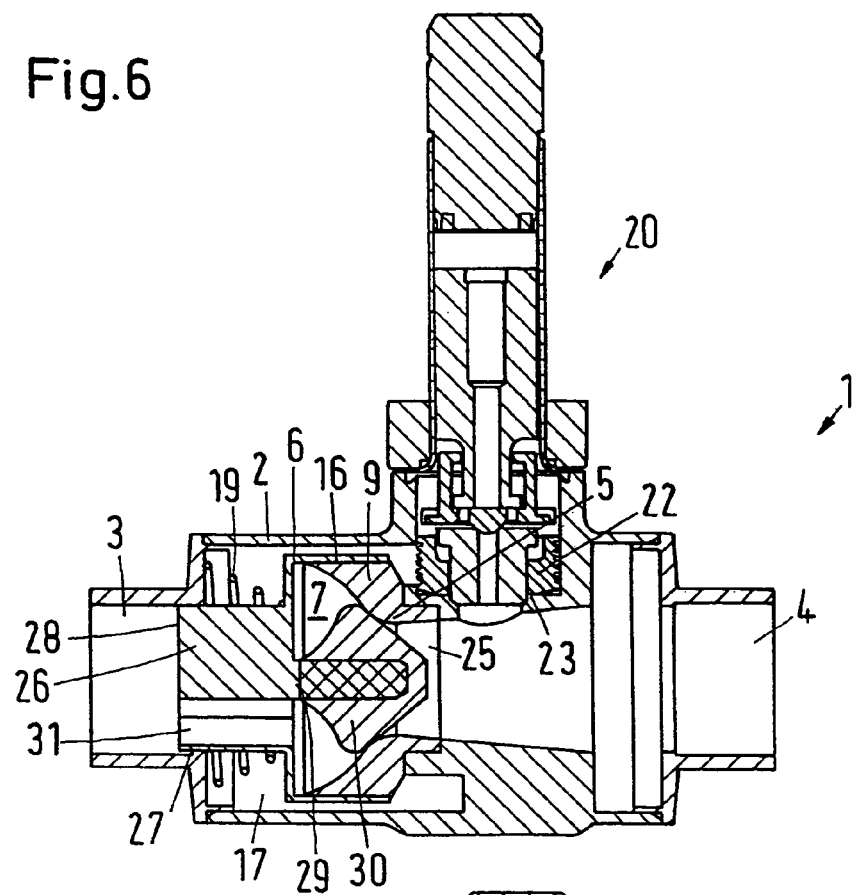
Figure 7:
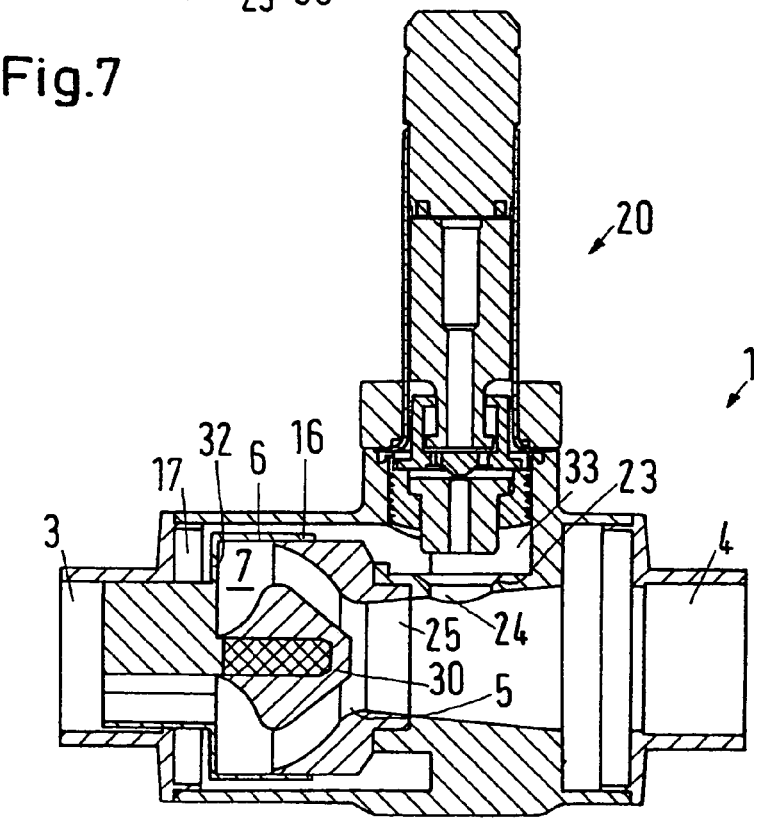

FIGS. 6 and 7 show an alternative embodiment in which similar and to one another corresponding parts are provided with the same reference numbers.

While in the embodiments of FIGS. 1 and 2 the guide 9 is arranged in the flow direction from the inlet 3 to the outlet 4 in front of the valve element 6, the guide 9 now is located in the flow direction behind the valve element 6. The guide in this case includes the valve seat 5, which as in the embodiment of FIGS. 1 and 2 is not only a component of the housing, but can also be formed as an insert.

In this case the seepage path 16 is formed between the valve element 6 and the guide 9. As above explained, the seepage path can also be formed at other places, for example, between the projection 26 and the interior wall of the inlet 3. The valve element 6 has a projection 26 by means of which it is guided in the housing 2, and more exactly said in the inlet 3. The projection 26 has a reduced diameter. In other words, the valve element 6 in the region of the guide 9 has an enlarged diameter.

The projection 26 has an annular wall 27 by means of which the valve element 6 is guided in the inlet 3 and which is connected with a middle part 29 of the valve element 6 by three or more arms 28. A closure element 30 is fastened to the middle part 29 and ultimately comes into engagement with the valve seat 5 when the valve element 6 is in the position illustrated in FIG. 6. Between the arms 28 are free openings 31 through which fluid from the inlet 3 can reach the interior space 7.

Fluid which reaches the inner space 7 from the inlet 3 through the openings 31 seeps through the seepage path 16 into the pressure space 17 and exerts a closing force on the valve element 6 which presses the valve element 6 into the position illustrated in FIG. 6. Supporting this is the force of the spring 7 and the pressure of the fluid issuing through the inlet 3.

When the pilot valve 20 (in the illustrations of FIGS. 6 and 7 a closing spring of the pilot valve 20 is omitted) is opened, then the pilot valve element 22 is lifted from the pilot valve seat 23 and the pressure space 17 comes into connection with the outlet 4 through the channel 24. The pressure in the pressure space 17 sinks. The pressure in the inlet 3 then works in the opening direction on a surface which is larger than the surfaces on which the pressure of the inlet works in the closing direction. This can for example, be a surface 32 which goes outwardly from the projection 26. The valve element 6 is thereby moved in the opening direction and the closure element 30 lifts from the valve seat 5. Thereby the opening 25 is made free and the fluid can flow from the inlet 3 through the outlet 4.

If the pilot valve 20 is closed, then pressure can again build up in the pressure space 17. A pressure build up can in the case of a closed valve element 6 take place relatively quickly because the seepage path 16 is here shortened in comparison to the closed position of the valve element 6, as shown by a comparison of FIGS. 6 and 7. The valve element 6 is therefore relatively quickly moved in the closing direction, so that the closure element comes into engagement with the valve seat 5.

In contrast to the construction of FIGS. 1 and 2, in the embodiment of FIGS. 6 and 7 the housing 2 has a recess 33 in which the pilot valve element 22 is moveable. The pilot valve seat 23 is at the foot of the recess 33. This construction has the advantage that it on one hand diminishes the construction height of the valve 1. On the other hand, bores and additional channels in the housing 2 are spared, for example, the channel 20.

Figure 8:
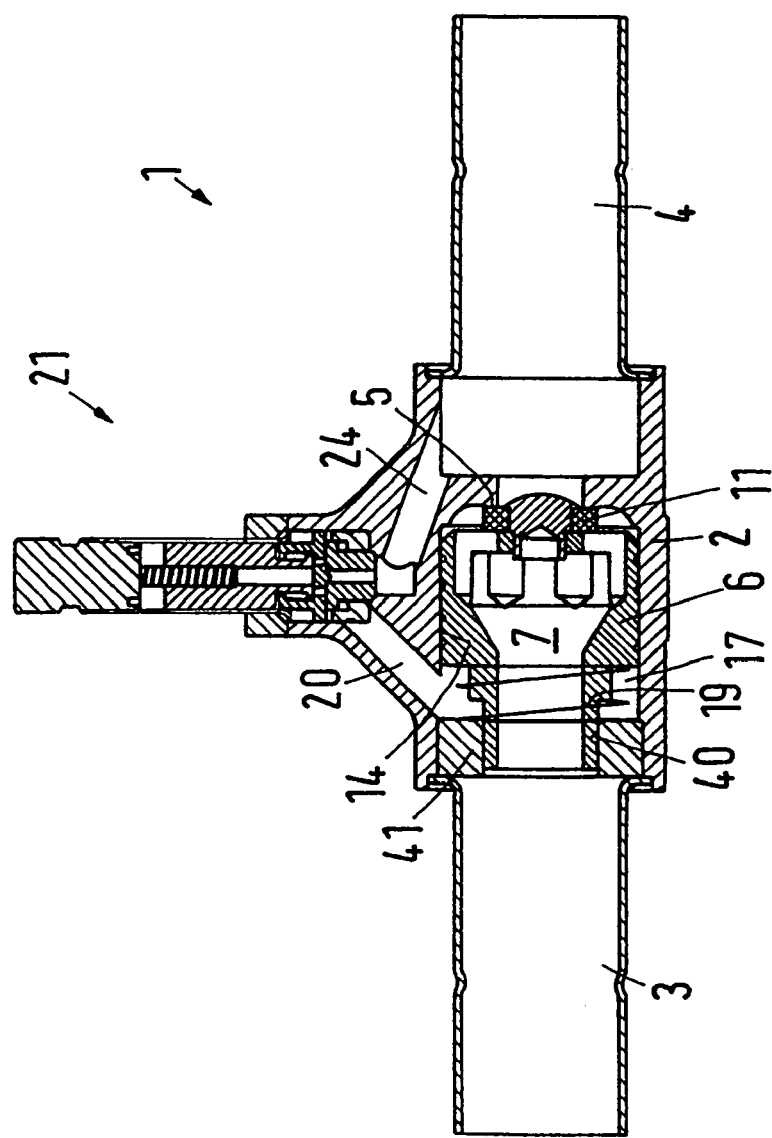

FIG. 8 shows a further embodiment of an axial valve which essentially corresponds to the embodiment of FIG. 1. Parts similar to those of FIG. 1 are provided with similar reference numbers.

In difference to the embodiment of FIG. 1 the valve element 6 is not only guided in the area of the wall 8 of the housing 2 on its outer circumference, but is also guided on a diminished section 40 which is surrounded by a housing guide 41. In general, the function of the construction of the axial valve 1 is similar to that of the embodiment according to FIG. 1. Here also the valve element 6 is arranged in the housing bore 14 free of seals, that is exceptionally small differential pressures between the inlet 3 and the outlet 4 are sufficient to move the valve element 6 from the valve seat 5 when the pilot valve 21 is opened.

What is claimed is:

1. An axial valve with a housing, an inlet, an outlet, a valve seat between the inlet and the outlet and a valve element cooperating with the valve seat, the valve element being controlled by a pilot valve arranged between the inlet and the outlet, wherein the valve element is moveable parallel to a flow path from the inlet to the outlet, is guided by an interior surface of the housing and surrounds an interior space, characterized in that a first section of the flow path leads through the interior space, a guide is arranged in the housing between the inlet and outlet, wherein the valve element is guided by an exterior surface of the guide, and a pressure space is arranged between the housing and the valve element, in which pressure space, in the case of the pilot valve being closed, a closing pressure working on the valve element is formed.

2. A valve according to claim 1, further characterized in that the guide surrounds a second section of the flow path.

3. A valve according to claim 2, further characterized in that the guide is fixed to the housing.

4. A valve according to claim 1, further characterized in that the flow path runs through the valve seat.

5. A valve according to claim 1, further characterized in that the valve element on its side facing the valve seat has a closed surface.

6. A valve according to claim 1, further characterized in that the valve element is guided without seals in a housing bore.

7. A valve according to claim 1, further characterized in that the pilot valve is arranged in a connection between the pressure space, in which prevails a pressure urging the valve element in the closing direction, and the outlet.

8. A valve according to claim 7, further characterized in that the pressure space is supplied with pressure through a seepage path which stands in connection with the interior space.

9. A valve according to claim 8, further characterized in that the seepage path is shortened upon opening of the valve.

10. A valve according to claim 7, further characterized in that a spring working in the closing direction is arranged in the pressure space.

11. A valve according to claim 2, further characterized in that the guide is arranged on the inlet side of the valve element.

12. A valve according to claim 2, further characterized in that the guide is arranged on the outlet side of the valve element.

13. A valve according to claim 12, further characterized in that the valve element has an enlarged diameter in the region of the guide.

14. A valve according to claim 12, further characterized in that the housing has a radially oriented recess in the region of the pilot valve.

* * * * *